US012219339B2

(12) United States Patent
Hu et al.

(10) Patent No.: US 12,219,339 B2
(45) Date of Patent: Feb. 4, 2025

(54) SPEAKER

(71) Applicant: AAC Microtech (Changzhou) Co., Ltd., Changzhou (CN)

(72) Inventors: Hongjian Hu, Shenzhen (CN); Min Su, Shenzhen (CN); Shuai Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 200 days.

(21) Appl. No.: 17/876,511

(22) Filed: Jul. 28, 2022

(65) Prior Publication Data

US 2023/0199399 A1 Jun. 22, 2023

(30) Foreign Application Priority Data

Dec. 17, 2021 (CN) ......................... 202123199074.7

(51) Int. Cl.

*H04R 9/06* (2006.01)
*H04R 7/04* (2006.01)
*H04R 9/02* (2006.01)
*H04R 9/04* (2006.01)

(52) U.S. Cl.

CPC ................. *H04R 9/06* (2013.01); *H04R 7/04* (2013.01); *H04R 9/027* (2013.01); *H04R 9/045* (2013.01); *H04R 9/046* (2013.01); *H04R 2209/041* (2013.01)

(58) Field of Classification Search

CPC . H04R 9/06; H04R 7/04; H04R 9/027; H04R 9/045; H04R 9/046; H04R 2209/041
See application file for complete search history.

(56) References Cited

U.S. PATENT DOCUMENTS

2020/0213720 A1* 7/2020 Wu ...................... H04R 1/2834

FOREIGN PATENT DOCUMENTS

CN 213126446 U * 5/2021

OTHER PUBLICATIONS

Translation of CN-213126446-U (Year: 2021).*

* cited by examiner

*Primary Examiner* — Andrew Sniezek
(74) *Attorney, Agent, or Firm* — W&G Law Group

(57) ABSTRACT

Provided is a speaker, including frame, vibration unit, and magnetic circuit unit driving the vibration unit and having magnetic gap, the vibration unit including diaphragm fixed to the frame, voice coil component fixed to the diaphragm and driving the diaphragm, and lower voice diaphragm component supporting the voice coil component. The voice coil component includes voice coil inserted in the magnetic gap and holder fixed to the diaphragm and the voice coil, the voice coil includes first and second voice coil portions. The first voice coil portion is arranged close to the lower voice diaphragm component and is fixed to the lower voice diaphragm component through the holder. The first voice coil portion includes two first sides and second side connecting thereto, and the second voice coil portion protrudes away from the second side. The voice coil component has greater circumference than the racetrack voice coil, enabling better acoustic performance.

8 Claims, 4 Drawing Sheets

A-A

25

SPEAKER

TECHNICAL FIELD

The present disclosure relates to the field of electroacoustic conversion technologies and, in particular, to a speaker.

BACKGROUND

With the advent of the era of mobile Internet, the number of intelligent mobile devices continues to rise. Among a large number of mobile devices, mobile phones are undoubtedly the most common and portable mobile terminal devices. Acoustic devices configured to play sound are widely used in today's intelligent mobile devices such as mobile phones.

In the related art, the acoustic device includes a frame, and a vibration unit and a magnetic circuit unit with a magnetic gap that are respectively fixed to the frame. The vibration unit includes a diaphragm and an elastic support component respectively fixed two opposite sides of the frame, a voice coil for driving the diaphragm to vibrate, and a lower voice diaphragm component elastically supporting the voice coil. The voice coil in the related art has a small circumference, leading to poor performance of the acoustic device. Moreover, according to the technical solution in the related art of increasing the circumference of the voice coil, a design space of the lower voice diaphragm component may be occupied, and even the size of the lower voice diaphragm component is required to be changed, which is obviously disadvantage to the performance of the speaker.

Therefore, there is a need to provide a holder and a speaker to solve the above problems.

SUMMARY

An objective of the present disclosure is to provide a speaker, including a frame, a vibration unit fixed to the frame, and a magnetic circuit unit driving the vibration unit to vibrate and provided with a magnetic gap, the vibration unit including a diaphragm fixed to the frame, a voice coil component fixed to the diaphragm and driving the diaphragm to vibrate to produce sound, and a lower voice diaphragm component elastically supporting the voice coil component. The voice coil component includes a voice coil inserted in the magnetic gap and a holder fixed to the diaphragm and the voice coil, the voice coil includes first voice coil portions spaced from and opposite to each other and second voice coil portions spaced from and opposite to each other and connected to the first voice coil portions. The first voice coil portion is arranged close to the lower voice diaphragm component relative to the second voice coil portion and is fixed to the lower voice diaphragm component through the holder. The first voice coil portion includes two first sides arranged opposite to each other and a second side connecting the two first sides, and the second voice coil portion protrudes, relative to the first side, away from the second side along a direction perpendicular to a vibration direction of the diaphragm.

As an improvement, a shape of the holder matches the voice coil.

As an improvement, the lower voice diaphragm component includes a flexible printed circuit board fixed to the voice coil component and a lower voice diaphragm attached and fixed to a side of the flexible printed circuit board away from the diaphragm.

As an improvement, the second voice coil portion includes two third sides arranged opposite to each other and connected to the first sides, and a fourth side connected to the two third sides.

As an improvement, the holder includes a first plate fixed to the diaphragm, a second plate fixed to the voice coil, a connecting wall connecting the first plate and the second plate, and a support portion extending from the second plate along an outer side of the voice coil toward the lower voice diaphragm component and fixed to the lower voice diaphragm component.

As an improvement, an opening is provided penetrating through the connecting wall along the direction perpendicular to the vibration direction of the diaphragm.

As an improvement, the magnetic circuit unit includes a lower clamp plate, a magnet component stacked on the lower clamp plate, and an upper clamp plate fixed to a side of the magnet component away from the lower clamp plate, a positioning hole is provided penetrating through the upper clamp plate along the vibration direction, a positioning post protrudes from a side of the frame away from the diaphragm along the vibration direction, and the positioning post is inserted in the positioning hole to realize the positioning and fixing of the frame and the upper clamp plate.

As an improvement, the magnet component includes a main magnet and an auxiliary magnet arranged around the main magnet, the main magnet and the auxiliary magnet are spaced from each other to form the magnetic gap, the voice coil component is inserted in the magnetic gap and arranged around the main magnet, and a shape of the main magnet matches the voice coil component.

As an improvement, the frame includes a fixed portion fixed to the magnet component, and an air channel communicating the speaker with the outside is provided penetrating through the fixed portion.

The present disclosure has the following beneficial effects. The circumference of the voice coil is lengthened on the premise of keeping the size and the design space of the lower voice diaphragm component fixedly connected to the voice coil component unchanged, so as to improve the acoustic performance of the present disclosure.

DESCRIPTION OF EMBODIMENTS

Figure 1:
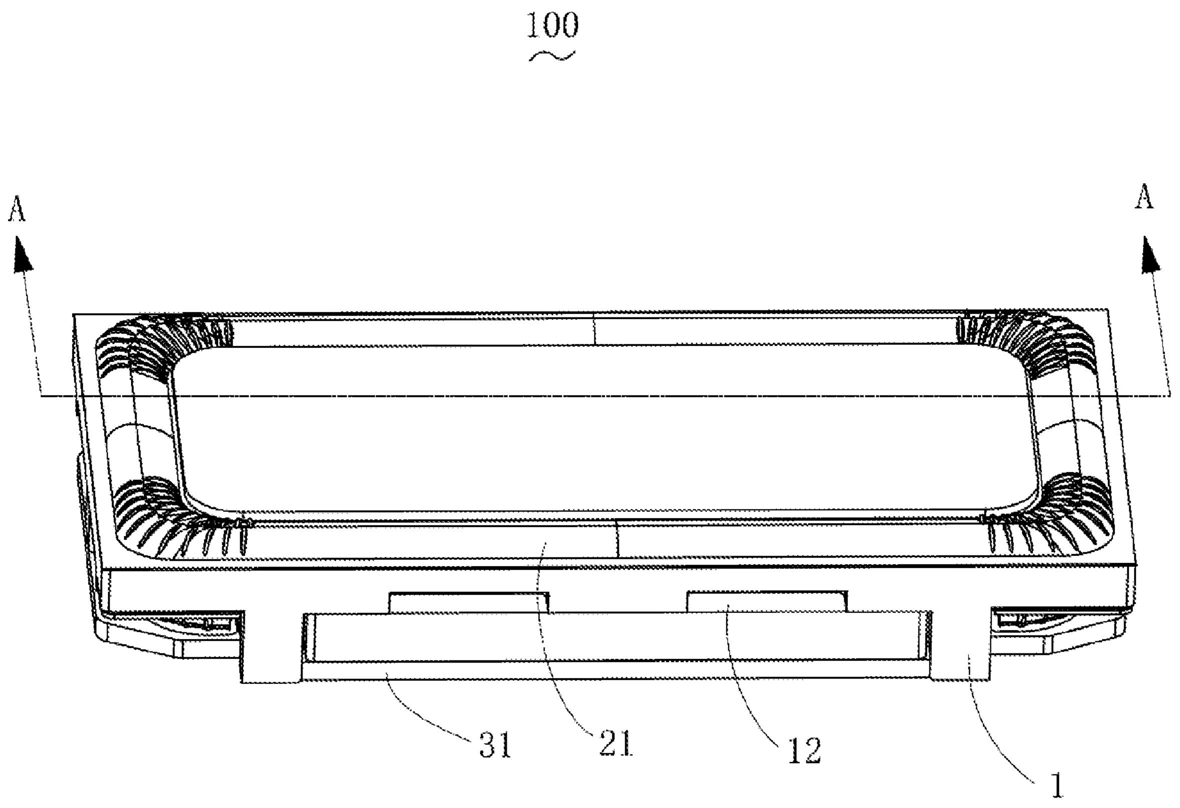
FIG. 1 is a schematic structural diagram of a speaker according to an embodiment of the present disclosure.

The technical solutions in embodiments of the present invention will be described below with reference to the accompanying drawings in the embodiments of the present disclosure. The described embodiments are some of rather than all of the embodiments of the present invention. All other embodiments acquired by those of ordinary skill in the art without creative efforts based on the embodiments of the present invention shall fall within the protection scope of the present invention.

Referring to FIG. 1 to FIG. 6 together, the present disclosure provides a speaker 100, including a frame 1, a vibration unit 2 fixed to the frame 1, and a magnetic circuit unit 3 driving the vibration unit 2 to vibrate and provided with a magnetic gap. The vibration unit 2 includes a diaphragm 21 fixed to the frame 1, a voice coil component 22 fixedly connected to the diaphragm 21, and a lower voice diaphragm component 23 elastically supporting the voice coil component 22. The lower voice diaphragm component 23 includes a flexible printed circuit board 231 fixed to the voice coil component 22 and a lower voice diaphragm 232 attached and fixed to the side of the flexible printed circuit board 231 away from the diaphragm 21. The lower voice diaphragm component 23 can effectively inhibit the voice coil component 22 from swinging during vibration, thereby improving an acoustic effect of the speaker 100.

Figure 5:
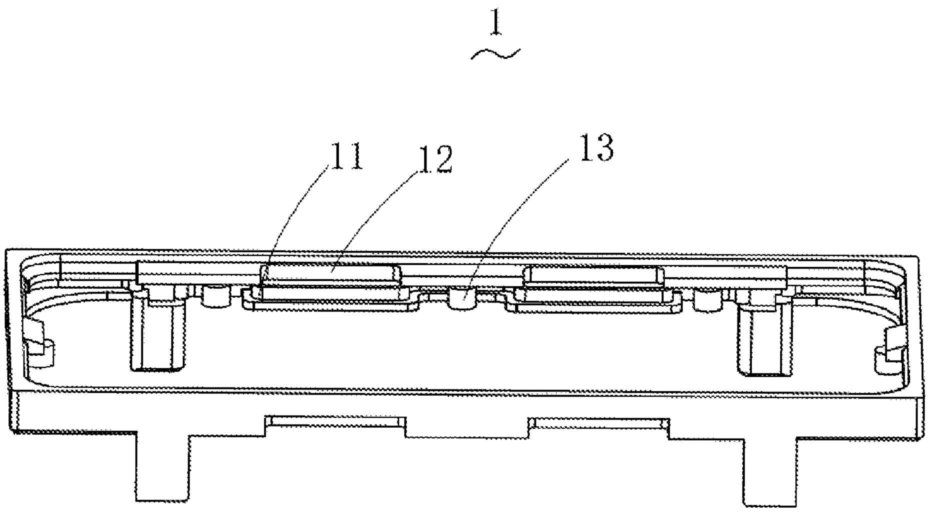
FIG. 5 is a schematic structural diagram of a frame of a speaker according to an embodiment of the present disclosure.
Figure 6:
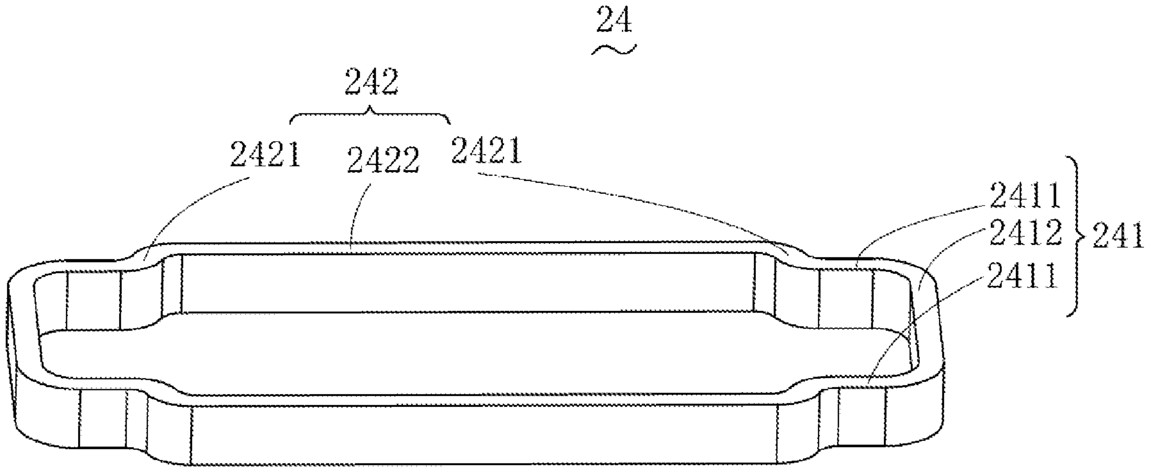
FIG. 6 is a schematic structural diagram of a voice coil of a speaker according to an embodiment of the present disclosure.

Referring to FIG. 5, the frame 1 includes a fixed portion 11 fixed to the magnetic circuit unit 3, and an air channel 12 communicating the speaker 100 with the outside is arranged through the fixed portion 11. With the arrangement of the air channel 12, the air circulation in the speaker 100 according to the present disclosure is smoother, and the acoustic effect of the speaker 100 is improved.

The voice coil component 22 includes a voice coil 24 inserted in the magnetic gap and a holder 25 fixedly connected to the diaphragm 21 and the voice coil 24. The voice coil 24 includes first voice coil portions 241 spaced from and opposite to each other and second voice coil portions 242 spaced from and opposite to each other and connected to the first voice coil portions 241. The first voice coil portion 241 is arranged close to the lower voice diaphragm component 23 relative to the second voice coil portion 242 and is fixed to the lower voice diaphragm component 23 through the holder 25. The first voice coil portion 241 includes two first sides 2411 arranged opposite to each other and a second side 2412 connecting the two first sides 2411. The second voice coil portion 242 protrudes, relative to the first side 2411, toward a side away from the second side 2412 along a direction perpendicular to a vibration direction of the diaphragm 21. With the arrangement, compared with the racetrack voice coil in the related art, the voice coil of the speaker 100 according to the present disclosure obviously has a greater circumference. At the same time, since the design shape of the first voice coil portion 241 may remain unchanged, in the speaker 100 according to the present disclosure, the circumference of the voice coil 24 is lengthened on the premise of keeping the size and the design space of the lower voice diaphragm component 23 fixedly connected to the voice coil component 22 unchanged, so as to improve the acoustic performance of the present disclosure. In this embodiment, the second voice coil portion 242 includes two third sides 2421 arranged opposite to each other and connected to the first sides 2411 and a fourth side 2422 connected to the two third sides 2421. It may be understood that, in other optional embodiments, the second voice coil portion may also be in other shapes, and can also have the above technical effect.

Figure 2:
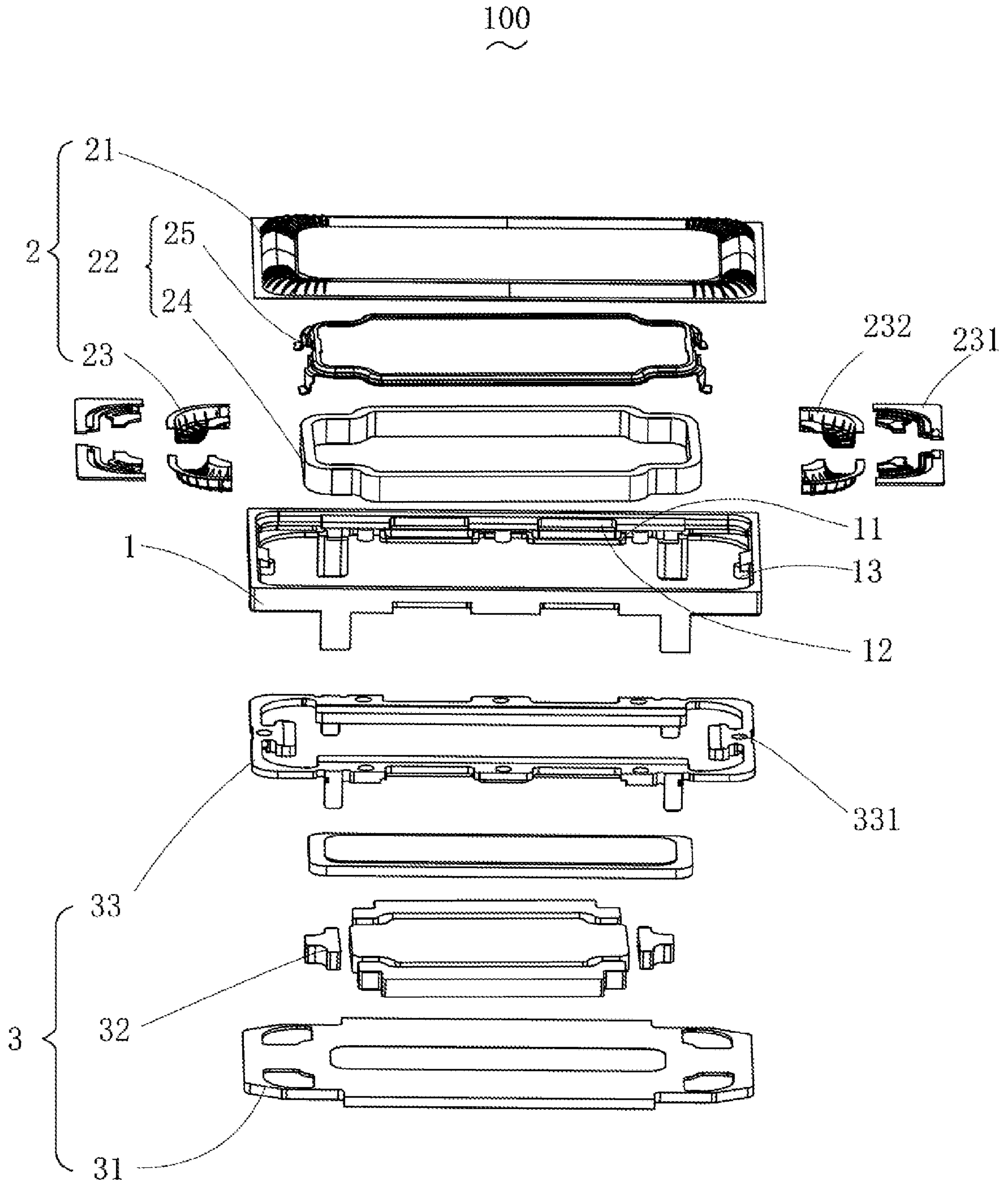
FIG. 2 is a schematic diagram of an exploded structure of a speaker according to an embodiment of the present disclosure.
Figure 3:
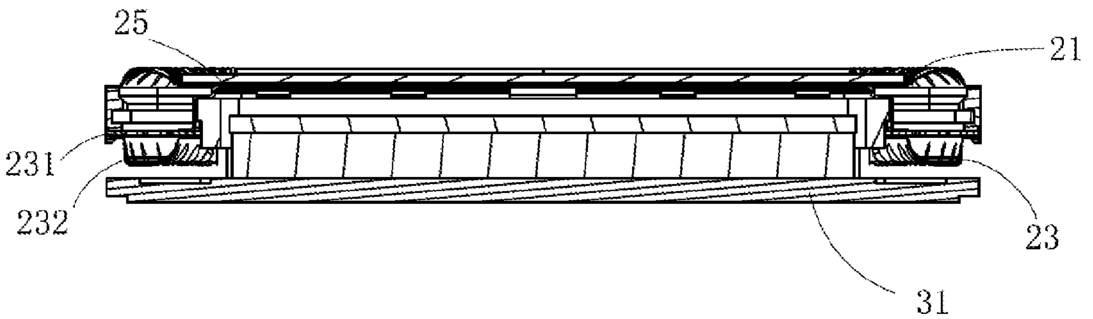
FIG. 3 is a schematic structural diagram of a section A-A of a speaker according to an embodiment of the present disclosure.
Figure 4:
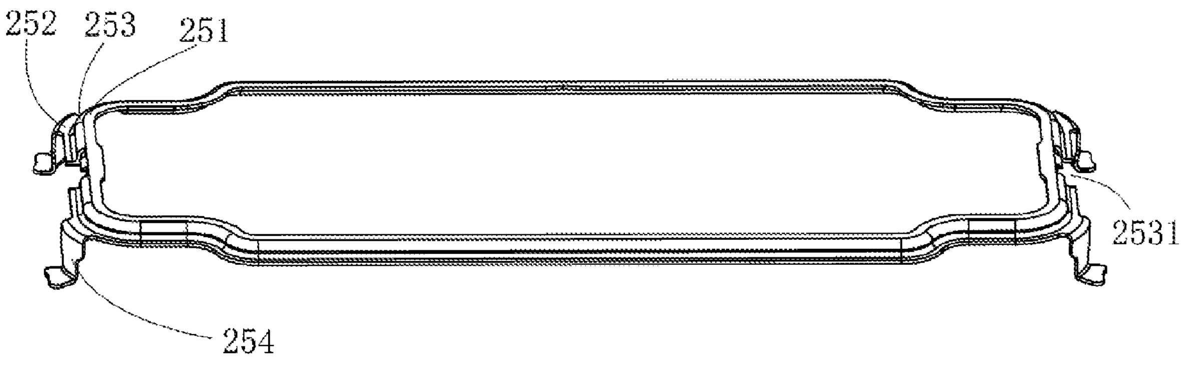
FIG. 4 is a schematic structural diagram of a holder of a speaker according to an embodiment of the present disclosure.

Referring to FIG. 2 to FIG. 4 together, a shape of the holder 25 matches the voice coil 24. The holder 25 includes a first plate 251 fixedly connected to the diaphragm 21, a second plate 252 fixedly connected to the voice coil 24, and a connecting wall 253 connecting the first plate 251 and the second plate 252. The holder 25 is provided with a support portion 254 extending from a corner of the second plate toward the lower voice diaphragm component 23. The support portion 254 is attached and fixed to a side surface of the first voice coil portion 241, which increases the fixing area of the holder 25 and the voice coil 24 and strengthens binding strength of the holder 25 and the voice coil 24. An opening 2531 is provided penetrating through the connecting wall 253 along the direction perpendicular to the vibration direction of the diaphragm 21, so that the air inside and outside the holder 25 can flow freely, thereby reducing the pressure difference inside and outside the holder 25, preventing vibration instability caused by the pressure difference of the speaker 100.

Referring to FIG. 2, FIG. 3, and FIG. 5, the magnetic circuit unit 3 includes a lower clamp plate 31, a magnet component 32 stacked on the lower clamp plate 31, and an upper clamp plate 33 fixed to the side of the magnet component 32 away from the lower clamp plate 31. The frame 1 is fixed to the magnet component 32 through a fixing portion 11, a positioning hole 331 is provided through the upper clamp plate 33 along the vibration direction, the side of the frame 1 away from the diaphragm 21 is provided with a positioning post 13 along the vibration direction, and the positioning post 13 is inserted in the positioning hole 331 to realize the positioning and fixing of the frame 1 and the upper clamp plate 33. The frame 1 realizes positioning and fixing through engagement with the positioning post 13 and the positioning hole 331, which improves accuracy of the speaker 100 during the assembly, increases a yield of the speaker 100 during the manufacturing, and thus improves structural stability of the speaker 100.

The present disclosure has the following beneficial effects. The circumference of the voice coil is lengthened on the premise of keeping the size and the design space of the lower voice diaphragm component fixedly connected to the voice coil component unchanged, so as to improve the acoustic performance of the present disclosure.

The above are only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. A speaker, comprising a frame, a vibration unit fixed to the frame, and a magnetic circuit unit driving the vibration unit to vibrate and provided with a magnetic gap, the vibration unit comprising a diaphragm fixed to the frame, a voice coil component fixed to the diaphragm and driving the diaphragm to vibrate to produce sound, and a lower voice diaphragm component elastically supporting the voice coil component, wherein the voice coil component comprises a voice coil inserted in the magnetic gap and a holder fixed to the diaphragm and the voice coil, the voice coil comprises first voice coil portions spaced from and opposite to each other and second voice coil portions spaced from and opposite to each other and connected to the first voice coil portions, the first voice coil portion is arranged close to the lower voice diaphragm component relative to the second voice coil portion and is fixed to the lower voice diaphragm component through the holder, the first voice coil portion comprises two first sides arranged opposite to each other and a second side connecting the two first sides, and the second voice coil portion protrudes, relative to the first side, away from the second side along a direction perpendicular to a vibration direction of the diaphragm;

wherein the magnetic circuit unit comprises a lower clamp plate, a magnet component stacked on the lower clamp plate, and an upper clamp plate fixed to a side of the magnet component away from the lower clamp plate, a positioning hole is provided penetrating through the upper clamp plate along the vibration direction, a positioning post protrudes from a side of the frame away from the diaphragm along the vibration direction, and the positioning post is inserted in the positioning hole to realize the positioning and fixing of the frame and the upper clamp plate.

2. The speaker as described in claim 1, wherein a shape of the holder matches the voice coil.

3. The speaker as described in claim 1, wherein the lower voice diaphragm component comprises a flexible printed circuit board fixed to the voice coil component and a lower voice diaphragm attached and fixed to a side of the flexible printed circuit board away from the diaphragm.

4. The speaker as described in claim 1, wherein the second voice coil portion comprises two third sides arranged opposite to each other and connected to the first sides, and a fourth side connected to the two third sides.

5. The speaker as described in claim 1, wherein the holder comprises a first plate fixed to the diaphragm, a second plate fixed to the voice coil, a connecting wall connecting the first plate and the second plate, and a support portion extending from the second plate along an outer side of the voice coil toward the lower voice diaphragm component and fixed to the lower voice diaphragm component.

6. The speaker as described in claim 5, wherein an opening is provided penetrating through the connecting wall along the direction perpendicular to the vibration direction of the diaphragm.

7. The speaker as described in claim 1, wherein the magnet component comprises a main magnet and an auxiliary magnet arranged around the main magnet, the main magnet and the auxiliary magnet are spaced from each other to form the magnetic gap, the voice coil component is inserted in the magnetic gap and arranged around the main magnet, and a shape of the main magnet matches the voice coil component.

8. The speaker as described in claim 1, wherein the frame comprises a fixed portion fixed to the magnet component, and an air channel communicating the speaker with the outside is provided penetrating through the fixed portion.

* * * * *